United States Patent Office 3,133,723
Patented May 19, 1964

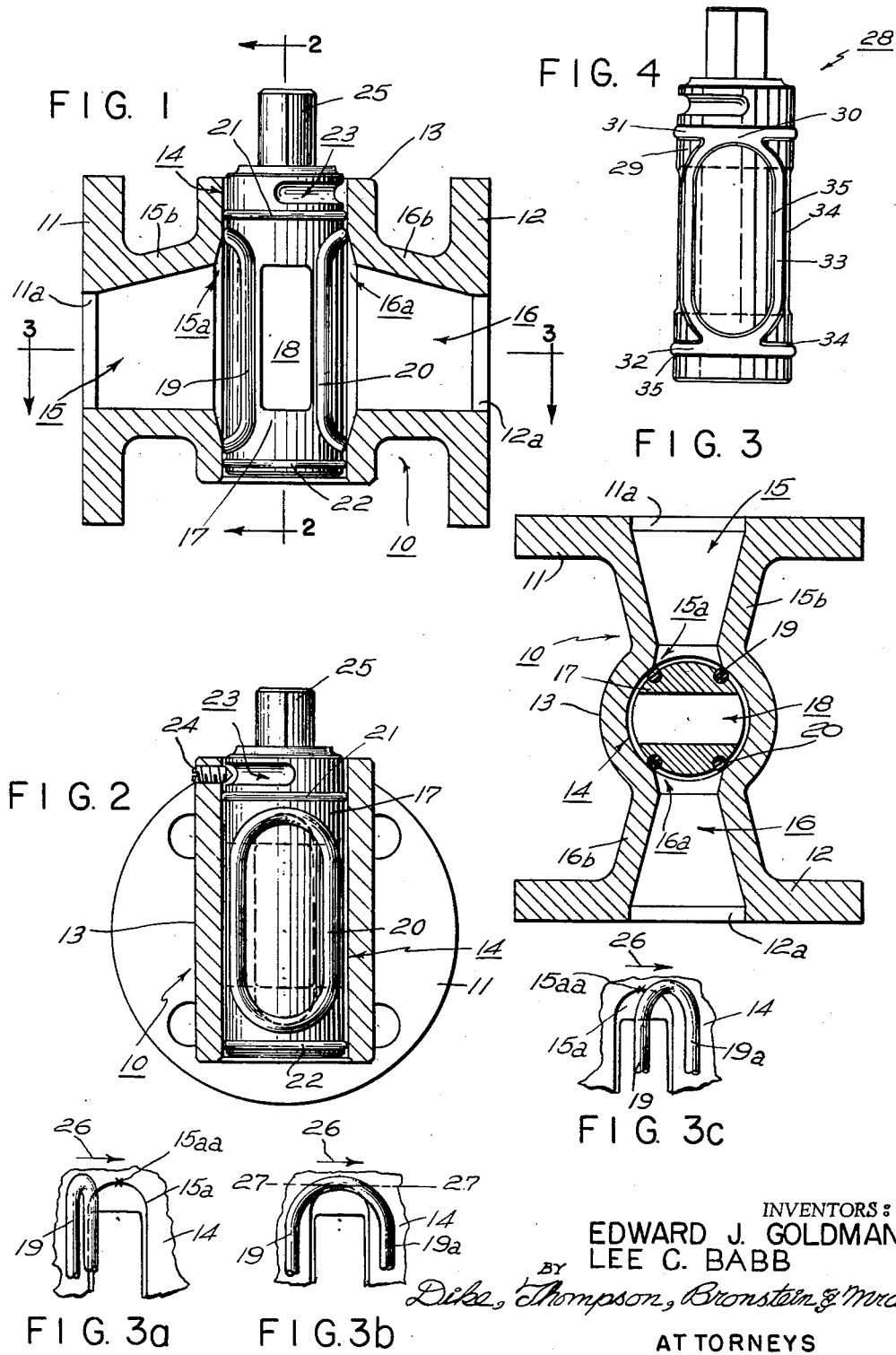

3,133,723
GAS VALVES
Edward J. Goldman, Milton, and Lee C. Babb, Lynnfield Center, Mass., assignors to Walworth Company, New York, N.Y., a corporation of Massachusetts
Filed Sept. 27, 1962, Ser. No. 226,625
7 Claims. (Cl. 251—309)

The present invention relates to improvements in valves and, in one particular aspect, to novel and improved gas cocks of a non-lubricated type employed to control the flow of gas from a utility street line into a building. Such valves must continue to seal tightly and yet be easily adjustable at inconvenient locations after remaining in one operating condition, i.e. open or shut, or partly so, for extended periods of time, even years.

Gas cocks commonly exploit a movable valve member, or plug, which controls flow of gas between ports in the body making connections wtih pipes or passages on different sides of the valve. Certain of the prior constructions have involved parts requiring expensive precision machining, particularly of the movable plug member and the seating surfaces with which it cooperates.

It also has been known that leakage around the ports might be suppressed by framing them with packing members held in grooves either in the cooperating inner seating surfaces of the valve body or outer surfaces of the movable valve members. In general, the designs of such valves have tended to be somewhat bulky, to become susceptible to leakage after prolonged use, and to resist easy adjustment in underground installations. According to the present teachings, however, improved gas valves which admit of large gas flows may nevertheless be adjusted upon application of only relatively low torques, involve sparing use of materials, avoid certain expensive precision-machining operations during manufacture, and are highly immune to wear-induced leakage after extensive use.

Force required for the turning, and setting, of a valve plug is governed in large measure by the plug diameter, that is, by the radial distance at which the seating forces between plug and body are effective about the axis of the adjustable valve stem. In the case of underground gas valves, which must be adjusted from street level by long-stemmed tools, such turning forces are of special concern, and the present invention minimizes these by exploiting valve plugs of relatively small diameter. However, this requires that the plugs also be of highly elongated configuration, such that the flow openings through them may be of large total areas needed to afford high flow capacity and low pressure drop. While gasket-type packings are selected for the sealing of these valves, thereby avoiding the troubles and costs of periodic fillings with lubricating sealants, it is found that effective seals between elongated ports and plug openings are difficult to make with packings and that they tend to be especially susceptible to leakage caused by concentrations of wear. Leakage in gas valves is of course particularly objectionable because escaping gas is usually hazardous, and when leakage occurs after the valve has been installed underground for a long period of time, as is apt to be the case, it is difficult both to locate the source and to remedy it. In accordance with this invention, gasket packings are nevertheless made to circumvent such problems, principally as the result of special relative configurations of the elongated packings and cooperating edges of the ports which they frame.

It is one of the objects of the present invention, therefore, to provide novel and improved gas valves of constructions which lend themselves to economical manufacture and which offer improved resistance to leakage by way of unique configurations of cooperating ports and gaskets.

Another object is to provide improved gas valves exhibiting relatively low turning torques and relatively large flow capacities, and which are especially suited to installations under ground where maintenance-free and non-leaking operation is required over prolonged periods.

A yet further object is to provide a simple, low-cost, non-lubricated gas cock having a small-diameter elongated plug carrying endless resilient packing of special configuration cooperating with a body port opening of a complementary configuration to avoid concentrations of gasket wear and to minimize likelihood of leakage.

By way of a summary account of practice of this invention in one of its aspects, the rotatable cylindrical plug member of a gas valve is cast in a small-diameter elongated form, with the usual transverse flow opening being produced in a corresponding elongated form to afford a desired large cross-sectional flow area. On each side of the plug, laterally of the flow opening, the cast cylindrical plug exhibits an endless surface groove which is elongated in the axial direction and comprises two spaced and parallel side portions connected by generally semicircular end portions. Into each of these endless grooves, in the "as cast" and therefore surface-roughened state, there is molded a thick rubber gasket of the same outline, the gasket in each instance protruding a substantial distance outwardly beyond the cylindrical plug surface. The valve body which cooperates with this plug includes a central cylindrical portion, having an elongated uniform-diameter bore slightly larger in diameter than the cylindrical plug and slightly less in diameter than the reaches of the molded gaskets in the plug. At two diametrically opposite sites, the surfaces of the central bore of the valve body are interrupted by axially-elongated port openings, the configurations of which are substantially the same as those of the oblong gaskets molded into the plug, although somewhat smaller all around so that the gaskets will frame the port openings when in registry with both of them. Pipe-coupling connections, having the usual circular flow openings, are formed integrally with the central valve body portion, one at each side, these being joined with the central body portion by way of flared intermediate sections in which the flow passageways are of gradually-changing cross-section matching the generally elongated body ports to the circularly-opened pipe connections. Internal machined cylindrical surfaces of the valve body may be lined with a thin layer of a corrosion-resistance plastic having a low coefficient of friction, such as a polytetrafluoroethylene, which aids in keeping turning torques at a low level, and simple O-ring seals between the valve body and both axial ends of the plug provide the remaining seals needed in the valve.

Although the features of this invention which are believed to be novel are set forth in the appended claims, greater detail as to the invention in its preferred embodiments and the further objects and advantages thereof may be readily comprehended through reference to the following description taken in connection with the accompanying drawings, wherein:

FIGURE 1 presents a side view of a gas valve constructed in accordance with the present teachings, the body alone being shown in cross-section;

FIGURE 2 is a transverse section of the same valve taken along section lines 2—2 in FIGURE 1, with the plug member and an associated stop being shown in full view;

FIGURE 3 provides a further cross-section of the same valve, taken along section lines 3—3 in FIGURE 1;

FIGURES 3a, 3b and 3c illustrate successive relative positions of part of a plug gasket and body port of the valve of FIGURES 1–3 as the plug is turned; and FIGURE 4 illustrates an improved construction of plug in which end seals are molded integrally with endless port-sealing gaskets.

The gas valve depicted in FIGURES 1–3 is of a type intended for underground installations, such as those which govern the utility supply of gas to buildings adjoining street mains, it being well understood that valves of this character should provide essentially non-leaking maintenance-free service over long periods of time and yet should be easily adjustable, manually, with the aid of a long-stemmed tool extended from street level, as occasion demands. A metal valve body, 10, is formed with a pair of integral pipe-connecting parts, shown as flanges 11 and 12, at each end which are designed for bolting of the valve into a pipeline, although other well-known couplings may of course be employed, as found necessary or desirable. The central and main body portion 13 of valve body 10 is in the general form of an elongated cylinder which is of a relatively small diameter when considered in relation to the size of the circular passageways 11a and 12a at the flanges, these passageways being of the same inner diameter as the pipelines with which the valve is to be connected. A uniform-diameter cylindrical bore 14 is machined through the central cylindrical body portion 13, where its surfaces are interrupted by diametrically-opposite oblong port openings 15a and 16a, the latter being elongated in the axial direction of the bore and being merged with the upstream and downstream flow passageways 15 and 16 by way of intermediate flared body sections 15b and 16b, respectively, which integrally unite the flanges and central body portion. It will be observed that flow passageways 15 and 16 achieve a gradual transition between the desired oblong and circular cross-sections which are of substantially the same area.

The adjustable valve member or plug, 17, is elongated and of a relatively small diameter permitting it to be mated coextensively with the central body portion while maintaining an important radial clearance from the seating surfaces of cylindrical bore 14. A transverse flow opening 18 is formed through the plug member, to provide for gas flow between the ports when the valve is in an opened condition, and this opening is of a generally elongated rectangular cross-section affording a large flow area through the small-diameter plug. Exterior surfaces of the plug member laterally of the flow opening 18, are formed with endless oblong grooves into which are molded endless rubber gaskets, or packings, 19 and 20 which are of outline complementing that of the ports 15a and 16a and are of somewhat larger proportions enabling them to frame the ports in enclosing sealed relationship when the valve is set in a fully-closed condition. An important feature of the plug assembly is found in the fact that the exterior cylindrical surfaces of the plug may be left "as cast" when made by a precision casting process. The surfaces of the two endless grooves for the gaskets 19 and 20, are left "as cast," that is, the usual surface roughness appearing when the member is cast is not removed by machining. In the case of the plug cylindrical surfaces, precision machining is in any event unnecessary, while the endless grooves are intentionally preserved with a highly rough surface so that the rubber gaskets 19 and 20 molded directly into them will adhere tenaciously, will maintain a tight seal with the plug, and will not become dislodged from the grooves under the most severe conditions of use which are likely to be encountered. Expense of manufacture is of course minimized in accordance with this practice. End seals required near axial extremities of the plug are provided by resilient O-rings 21 and 22, which are seated on the plug 17 in purely circumferential grooves which can be readily machined. The further arcuate groove 23, which extends circumferentially about 90 degrees and is disposed beyond the sealed regions, may also be left as cast, being merely a locking and stopping groove into which the body-supported set screw 24 projects to prevent undue axial displacements between the plug and body and to limit the permissible plug rotation as the stem 25 is turned by an operator with the aid of a suitable tool.

As is evident from the FIGURE 3 illustration, particularly, the resilient molded gaskets 19 and 20 project outwardly beyond the cylindrical reaches of the plug 17 by a material amount. When the plug and body are mated, as shown, both of the gaskets are firmly compressed, or squeezed, and seat tightly against the surfaces of bore 14 to establish proper sealing about the ports under both high and low differential pressures, although the remaining annular gap between the plug and body is always preserved at a sufficient radial width to insure that the relatively rough cylindrical exterior of the plug cannot contact and abrade the smooth cylindrical seating surfaces of bore 14. Preferably, the outside diameter of the plug should be at least rough machined, or cast by a precision casting method. Preferably, the interior surfaces of the valve body are very thinly coated with a layer of polytetrafluoroethylene plastic, resulting from a cold spray of the plastic in an aqueous suspension, followed by baking. The thin coating does not appear in the illustrations, where it would be significantly out of proportion if magnified sufficiently to be visible; its presence over the smooth uniform-diameter bore surfaces is of value especially in producing a low coefficient of friction which facilitates unlubricated movement of the molded rubber gaskets and prevent shearing of these thick gaskets.

Although low turning torques, as well as economical manufacture and sparing use of materials, dictate that the inlet and outlet passageways and the plug opening be of highly elongated rectangular configuration, it is found that this is not a satisfactory configuration for the port openings and the main gaskets 19 and 20 and that it quickly leads to wear and leakage. Instead, the problems of wear and leakage are only solved when the gaskets and port openings 15a and 16a are formed with generally semi-circular narrower ends, or their equivalent, such as are shown in the full-line illustration of gasket 20 and the dashed-line illustration of port 15a appearing in FIGURE 2. The reasons for this are revealed in an analysis of what takes place as the gaskets and port openings are moved in relation to one another, with the aid of the portrayals in FIGURES 3a, 3b and 3c. Arrow 26 there characterizes the direction of progressive wiping movement of the plug-mounted molded rubber gasket 19 across the edges of upstream port 15a intersecting the cylindrical seating surfaces of bore 14 in the central body portion of the valve. Both the bore surfaces and gasket are cylindrical in contour, and, for purposes of clarity in the illustrations, the plug into which the gasket is securely molded has been eliminated from the fragmental showings in these figures. As the plug is first turned from its fully-open state toward a closed condition, one of the parallel sides, 19a, of the oblong gasket is wiped across a first corresponding parallel side or edge of the oblong port opening (FIGURE 3a), and there is no sustained wearing of the gasket at any one position. Continued movement in the same direction causes the curved narrower end of the gasket to wipe across the correspondingly curved narrower end of the port (FIGURE 3b) and there likewise can be no sustained wearing of the gasket at any one position. Although the tip of the port edge, 15aa, will continue its wearing effect along one line of wear, 27—27, as seen by the gasket, this is not a serious matter at all because tip 15aa is essentially a point, rather than a line, and hence does not continuously abrade the same surfaces of the gasket during turning movements of the plug. This matter can be better understood by considering what would be the effect if the narrower end of the port opening were straight (i.e. purely circumferential) rather than curved; in that event, the circumferential edge would abrade the gasket continuously over the line of wear during a large angular travel of the gasket, and the tendencies toward leakage would be significantly greater. Where, instead, the curved end of the port opening possesses a narrower tip, such as 15aa, this point can only ride across any given part of the gasket during a very small portion of its angular travel, so that wear and leakage are minimized.

Wear effects, as well as shearing tendencies, are reduced by avoiding sharp edges about the body ports, and preferably, the body material at the edges of ports 15a and 16a forms a small angle, everywhere about the ports for these purposes. For purposes of clarity in the illustrations, these angles are shown somewhat exaggerated, although the angles are small enough to cause a "shoehorning" effect on the gaskets and to avoid pinching them. Although the illustrated semi-circular configurations for the narrower ends of the gaskets and ports are preferred from the standpoint of ease of manufacture, other equivalent configurations yielding the same improvements in wear are useful also. The molded rubber gaskets are found to be highly susceptible to damage where their narrower ends terminate in sharp corners, however, and it is therefore preferred that the end configurations involve only gradual curvatures. In some designs, only one molded rubber gasket may be required; in others, the gaskets may be fixed with the body, rather than the plug, and the plug flow opening must then be especially shaped and the plug surfaces carefully machined.

As is evident from the illustration in FIGURE 4, an improved plug assembly designed to cooperate with a valve body of the type represented in FIGURES 1–3 may advantageously provide for end seals without requiring separate machining of circumferential grooves and without involving separate O-ring seals. This assembly, 28, is formed using an "as cast" plug 29, i.e. one which has not been machined after casting and which therefore exhibits minute surface irregularities, the outer surface being provided not only with specially-shaped endless grooves disposed to frame the body port openings but also with a pair of spaced circumferential grooves. The latter grooves are merged with the tips of the port-framing grooves, such that rubber molded into the "as cast" grooving fills all of them and forms the solidly-anchored integral gasketing 30 shown in FIGURE 4. End-sealing circumferential portions 31 and 32 merge with the tips of the narrower ends of the endless port-framing gasket portion 33, and the curved end configurations of the latter required for present purposes are thus not disturbed. Molding of the end seals 31 and 32 directly into "as cast" grooving, and merging of these seals with the port-framing seals, assures permanent gas-tight sealing of all the gasketing with the plug and conserves axial height of the plug. Preferably, the exterior of the thick rubber gasketing is shaped such that only its mid portions are raised and project outwardly into contact with the inner bore of the valve body, narrow edges or "shore lines," 34 and 35, on both sides being preserved at about the same diameter as the metal plug 29 to promote optimum distributions of stresses in the gasketing.

Practice of this invention is not restricted to the specific form of mechanism illustrated, and in this connection it should be understood that the foregoing description has been presented by way of explanation rather than limitation; those skilled in the art will recognize that various modifications, substitutions and combinations may be effected without departure either in spirit or scope from this invention in its broader aspects.

What we claim as new and desire to secure by Letters Patent of the United States is:

1. A non-lubricated gas valve of the plug valve type, comprising a metal valve body member having an elongated gas passageway therethrough intercepting an elongated plug-receiving opening therein, an elongated metal plug member disposed in said plug-receiving opening for rotation about an axis and having an elongated flow passageway therethrough extending substantially perpendicularly to said axis, one of said members being cast with an elongated endless groove therein in position to surround the passageway through the other of said members when the valve is in a closed condition, the elongated passageway surrounded by said groove having narrower ends which are shaped to terminate substantially as points, and an endless gasket of elastomeric material bonded directly in said cast groove in said one of said members and projecting outwardly thereof into sealed seating engagement with the other of said members, said members, passageways, opening and groove all being elongated in the direction of said axis of rotation of said plug member.

2. A non-lubricated gas valve of the plug valve type, comprising a metal valve body member having a gas passageway therethrough intercepting and forming elongated ports in the surfaces of an elongated plug-receiving opening therein, an elongated metal plug member disposed in said plug-receiving opening for rotation about an axis and having an elongated flow passageway therethrough extending substantially perpendicularly to said axis, said plug member being cast with an elongated endless groove therein in position to surround one of said ports when the valve is in a closed condition, said one of said ports having narrower ends which are shaped to terminate substantially as points, and an endless gasket of elastomeric material in said grooved bonded directly with the unfurnished cast surfaces of said groove and projecting outwardly therefrom into sealed seating engagement with the surfaces of said opening in said valve body member, said plug member, flow passageway, opening, ports, groove and gasket all being elongated in the direction of said axis of rotation of said plug member.

3. A non-lubricated gas valve of the plug valve type, comprising a metal valve body having a gas passageway therethrough intercepting and forming oppositely-disposed elongated ports in the surfaces bordering an elongated uniform-diameter plug-receiving bore therein, an elongated rotatable cylindrical metal plug in said bore mated with said body in radially-spaced relationship therewith for rotation about an axis and having an elongated flow passageway therethrough extending substantially perpendicularly to said axis, said plug being cast with a pair of elongated endless grooves on opposite sides thereof in position to surround different ones of said ports when the valve is in a closed condition, said ports having narrower ends which are shaped to terminate substantially as points, and different endless molded rubber gaskets in said grooves and bonded directly with the unfinished cast surfaces of said grooves and projecting outwardly therefrom into sealed seating engagement with the seating surfaces of said bore, said plug, bore, ports, flow passageway, grooves and gaskets all being elongated in the direction of said axis of rotation of said plug.

4. A non-lubricating gas valve of the plug valve type as set forth in claim 3, wherein each of said elongated ports has substantitally parallel side edges connected at their ends by an outwardly-extending continuation of said edges which is out of parallelism with purely circumferential lines around said bore.

5. A non-lubricated gas valve of the plug valve type as set forth in claim 4 wherein each of said elongated ports and gaskets has substantially parallel side portions connected at their ends by substantially semicircular end portions, whereby concentrations of wear of said gaskets in passing across said ports are minimized.

6. A non-lubricated gas valve of the plug valve type as set forth in claim 5 wherein said metal valve body includes a central cylindrical body portion having said uniform-diameter bore coaxially therethrough, and a pair of pipe-connecting portions integral with said central body portion on opposite sides thereof in each of which the gas passageway therethrough gradually changes from a circular cross-section at the ends to an elongated cross-section at the sites of said ports, wherein the valve body surfaces bordering said uniform-diameter bore are lined with a thin coating of polytetrafluoroethylene plastic, wherein the exterior cylindrical surfaces of said plug are in the unfinished state and are separated from said seating surfaces by said molded rubber gaskets, wherein the edges of said ports are defined by body surfaces at small angles to one another to reduce wear and shearing of said gaskets, and further comprising resilient sealing means between and concentric with said plug and said surfaces of said valve body near each axial end of said plug.

7. A non-lubricated gas valve of the plug valve type as set forth in claim 6 wherein said plug is cast with a pair of axially-spaced circumferential grooves each merging with said elongated grooves at the narrower ends thereof, and wherein said resilient sealing means comprises molded rubber gaskets bonded directly with the unfinished cast surfaces of said circumferential grooves and merging with and integral with said endless rubber gaskets at the narrower ends thereof.

References Cited in the file of this patent

UNITED STATES PATENTS

| | | |
|---|---|---|
| 1,721,877 | Feldmeier | July 23, 1929 |
| 2,547,116 | Gould | Apr. 3, 1951 |
| 2,995,057 | Nenzell | Aug. 8, 1961 |
| 3,035,811 | Hamer | May 22, 1962 |

FOREIGN PATENTS

| | | |
|---|---|---|
| 522,466 | Italy | Apr. 7, 1955 |